Dec. 15, 1959  H. HERTZ  2,917,671
CONTROLLABLE GASEOUS ELECTRIC DISCHARGE DEVICE
Filed Oct. 12, 1955  4 Sheets-Sheet 1

INVENTOR.
HELLMUTH HERTZ
BY
*Fred M. Vogel*
AGENT

Dec. 15, 1959 H. HERTZ 2,917,671
CONTROLLABLE GASEOUS ELECTRIC DISCHARGE DEVICE
Filed Oct. 12, 1955 4 Sheets-Sheet 3

INVENTOR.
HELLMUTH HERTZ
BY
Fred M. Vogel
AGENT

United States Patent Office 2,917,671
Patented Dec. 15, 1959

2,917,671

CONTROLLABLE GASEOUS ELECTRIC DISCHARGE DEVICE

Hellmuth Hertz, Lund, Sweden, assignor, by mesne assignments, to North American Philips Company, Inc., New York, N.Y., a corporation of Delaware Application October 12, 1955, Serial No. 540,095

Claims priority, application Germany October 15, 1954

2 Claims. (Cl. 315—336)

This invention relates to devices comprising a controllable gas-discharge tube with cold, non-actuated electrodes. Furthermore the invention relates to gas-discharge tubes for use in such devices.

For several uses high-vacuum amplifier tubes suffer from a disadvantage in that a fairly considerable amount of heating energy has constantly to be supplied to the cathode, and in that their lifetime is limited.

Gas-discharge tubes are usually controllable only when using alternating voltage since, once the discharge is struck, control voltage variations no longer influence the discharge.

The present invention has for its object to provide means for nevertheless controlling a direct current discharge.

In accordance with the invention, a device comprising a controllable gas-discharge tube with cold, non-activated electrodes comprises an electrode situated in the proximity of one of the main electrodes in such manner that on applying a control voltage, which is lower than the voltage between the main electrodes, high field strengths occur between said third electrode and the adjacent main electrode with the result that the charge carriers produced in the main discharge path are capable of re-ionisation and thus permit the main current to be acted upon.

The discharge between the auxiliary electrode and the main electrode is preferably non-self-sustained in order that the sensitivity of the control may be as high as possible.

A particularly advantageous form of a device in accordance with the invention is that for voltage stabilisation. In this case the voltage to be stabilised is applied through a high resistor between the two main electrodes, and the auxiliary electrode is connected through a lower resistor to the adjacent main electrode, the stabilised voltage being taken from across the main electrodes.

Figures 1, 2:
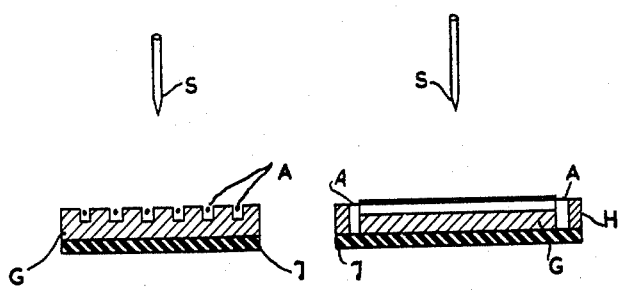
Figure 3:
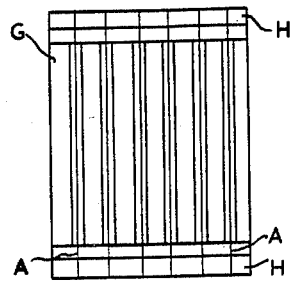
Figure 6:
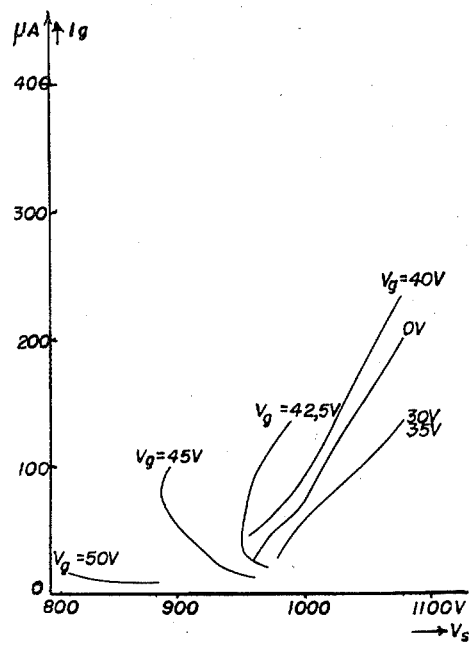
Figure 7:
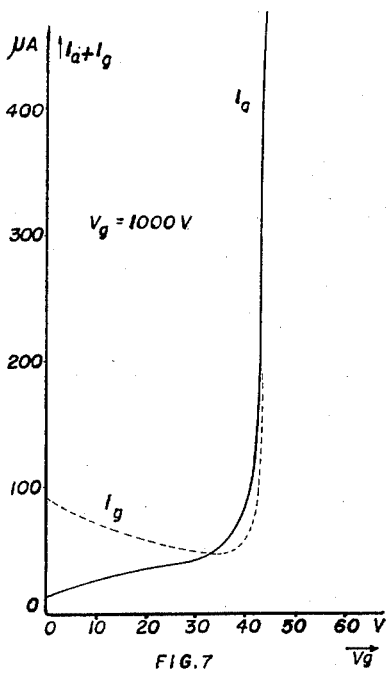
Figure 8:
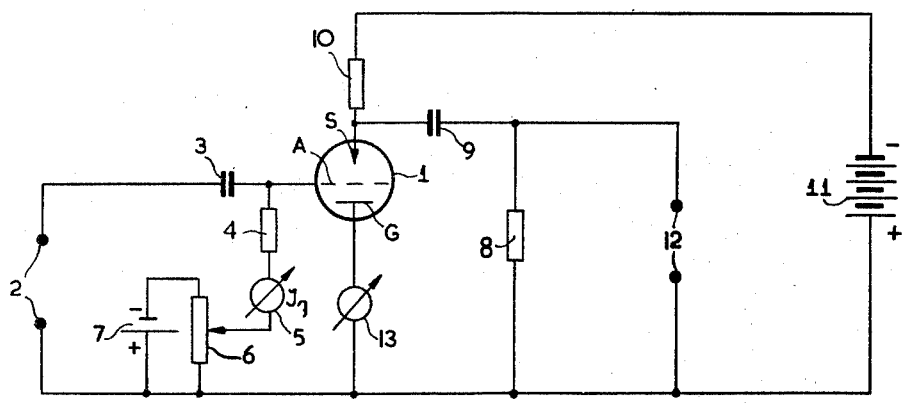
Figure 10:
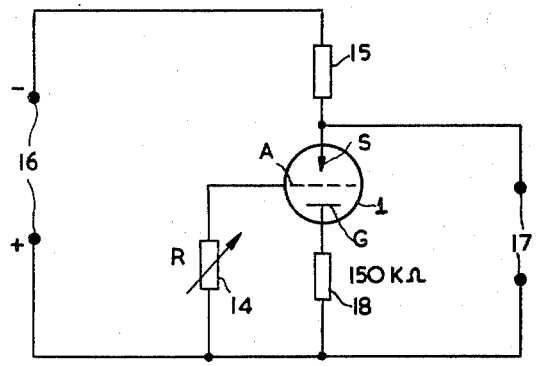
Figure 9:
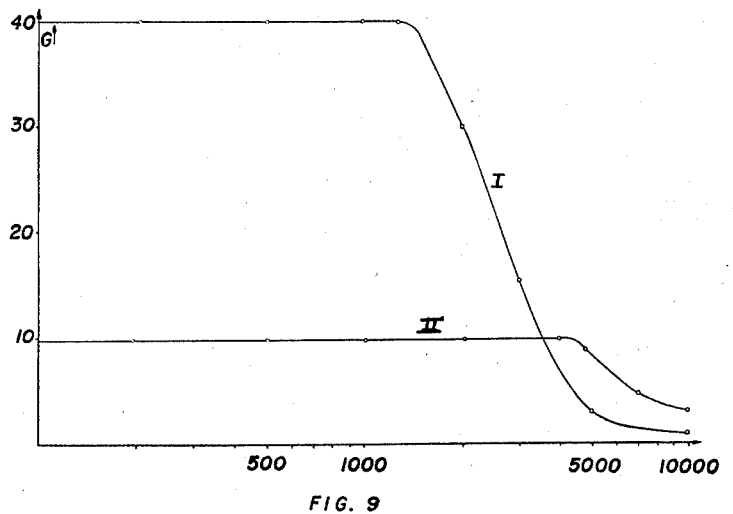
Figure 11:
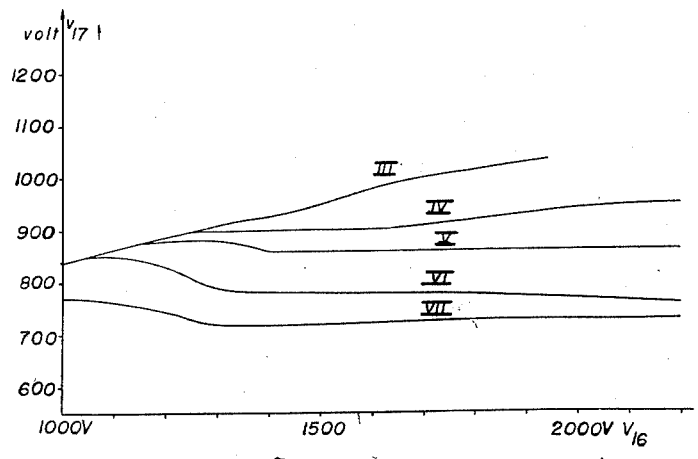

In order that the invention may be readily carried into effect, an example will now be described in detail with reference to the accompanying drawings, in which Figures 1, 2 and 3 are two sectional views and a plan view respectively of the electrode system of a discharge tube for use in a device in accordance with the invention, Figures 4, 5, 6 and 7 show a number of current versus voltage characteristics, Fig. 8 represents an amplifying circuit-arrangement for this tube, Fig. 9 illustrates the voltage amplification measured on this tube, Fig. 10 shows a stabilisation circuit-arrangement, and Fig. 11 shows the resultant voltage.

In Fig. 1, an insulator I carries a metal plate G provided with parallel slots.

Figure 4:
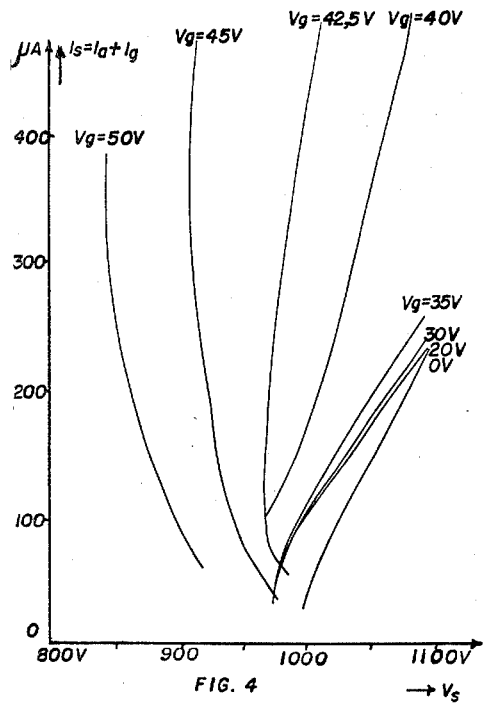
Figure 5:
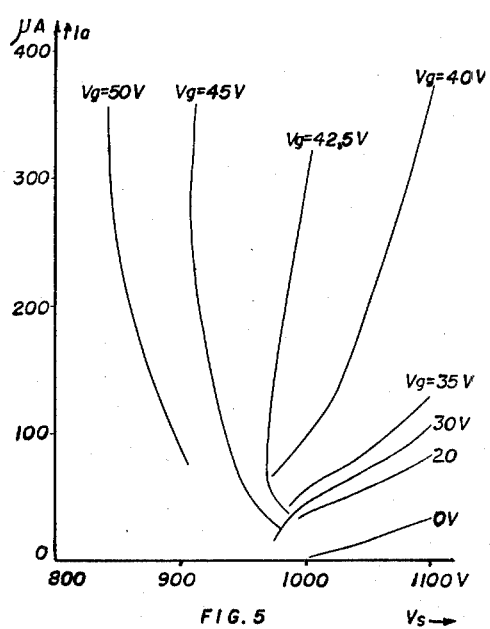

A pointed electrode S is spaced a few millimetres from the slotted surface of an electrode G. Arranged in said slots are a number of wires A secured to two beams H. Fig. 2 is a sectional view parallel to the wires, and Fig. 3 is a plan view. In a tube drafted substantially to scale in Figs. 1 and 2 and in which the space between S and G is 10 mms., the diameter of point S is 0.3 mm. and the gas-filling is hydrogen at a pressure of 150 mms. of mercury. Fig. 4 shows the current I supplied to the punctiform electrode S as a function of the voltage $V_s$ set up between the electrodes G and S and at a voltage $V_g$ between A and G as a parameter. Fig. 5 shows the current $I_a$ supplied to the electrode A likewise as a function of the voltage $V_s$, and Fig. 6 shows the current $I_g$ supplied to the electrode G likewise as a function of the voltage $V_s$.

Fig. 7 shows the variation of $I_a$ and $I_g$ as a function of the voltage $V_g$ at a constant value of the voltage $V_s$ of 1000 volts.

Fig. 8 shows an amplifying circuit-arrangement, in which the gas-discharge tube is denoted by 1 and the three electrodes by S, A and G respectively. The input voltage is supplied to terminals 2 and through a coupling capacitor 3 of .1 μf. to the electrode A. This electrode is further connected by way of a coupling resistor 4 of 100,000 ohms and an ammeter 5 to a movable contact of a potentiometer 6 of 6 kΩ which is connected across a voltage source 7. The pointed electrode S is connected through a resistor 10 of 5 megohms to the negative terminal of a voltage source 11 and through a coupling capacitor 9 of .02 μf. to an output resistor 8 of 2 megohms.

In Fig. 9 the resultant voltage amplification is slotted on the vertical axis as a function of the frequency on the horizontal axis. The curve I holds for a space of 10 mms. between S and by the curve II for a space of 4 mms. between S and G. In said cases, the voltage applied between electrodes A and S was 1000 volts and 660 volts respectively, the voltage $V_g$ measured between A and G being 42.5 volts, the current $I_a$ being 250 μa. and the current $I_g$ being 125 μa.

Fig. 10 shows a voltage stabilisation circuit-arrangement, in which the stabilised voltage applied to terminals 16 is supplied through a resistor 15 of 2 megohms to the electrode S and a resistor 18 of 150 kΩ to the electrode G. The output voltage is taken off across the tube and the resistor 18 together. The electrode A is connected to the other end of the resistor 18 through a resistor 14. The tube was filled with hydrogen of 110 mms. mercury pressure, the current through the tube being 200 to 500 μa. Fig. 11 indicates the value of the output voltage $V_{17}$ as a function of the input voltage $V_1$. On the curve III the resistor 14 has a value of 200 kΩ, on curve IV a value of 430 kΩ, on curve V a value of 570 kΩ, and on curve VI a value of 1040 kΩ. On the curve VII the resistor 14 has an infinite resistance.

What is claimed is:

1. A gas-discharge device comprising an envelope, a pair of spaced, cold, non-activated electrodes defining a main discharge path, one of said electrodes comprising a plate-like member having a plurality of slots and the other a corona discharge-type electrode, an ionizable gaseous medium in said envelope, means to apply a given potential between said electrodes to initiate a discharge therebetween, and an auxiliary electrode comprising a plurality of strip-like members one of which is disposed in each of said slots and spaced from the sides thereof, means to apply a lower potential than said given potential to said auxiliary electrode, said auxiliary electrode being spaced a distance from said plate-like electrode at which a field produced therebetween causes reionization of charge carriers produced in the main discharge path to thereby control the discharge between said main electrodes.

2. A gas-discharge device comprising an envelope, a pair of spaced, cold, non-activated electrodes defining a main discharge path, one of said electrodes comprising a plate-like member having a plurality of slots and the other being a pointed electrode for producing a corona discharge, an ionizable gaseous medium in said envelope, means to apply a given potential between said electrodes to initiate a discharge therebetween, and an auxiliary electrode comprising a plurality of strip-like members one of which is disposed in each of said slots and spaced from the sides thereof, means to apply a lower potential than said given potential to said auxiliary electrode, said auxiliary electrode being spaced a distance from said plate-like electrode at which a field produced therebetween causes reionization of charge carriers produced in the main discharge path to thereby control the discharge between said main electrodes.

References Cited in the file of this patent

UNITED STATES PATENTS

| | | |
|---|---|---|
| 2,607,902 | Townsend | Aug. 19, 1952 |
| 2,621,313 | Steinberg | Dec. 9, 1952 |

FOREIGN PATENTS

| | | |
|---|---|---|
| 562,211 | Great Britain | June 22, 1944 |
| 237,482 | Switzerland | Apr. 30, 1945 |

UNITED STATES PATENT OFFICE
CERTIFICATE OF CORRECTION

Patent No. 2,917,671                                                       December 15, 1959

Hellmuth Hertz

It is hereby certified that error appears in the printed specification of the above numbered patent requiring correction and that the said Letters Patent should read as corrected below.

Column 1, line 16, for "non-actuated" read -- non-activated --.

Signed and sealed this 31st day of May 1960.

(SEAL)
Attest:

KARL H. AXLINE
Attesting Officer

ROBERT C. WATSON
Commissioner of Patents